J. C. HALDEMAN.
FEED MECHANISM.
APPLICATION FILED JULY 11, 1919.

1,375,694.

Patented Apr. 26, 1921.
2 SHEETS—SHEET 1.

INVENTOR,
James Clyde Haldeman
By Frease, Merkel, Saywell and Bond
ATTYS.

J. C. HALDEMAN.
FEED MECHANISM.
APPLICATION FILED JULY 11, 1919.

1,375,694.

Patented Apr. 26, 1921.
2 SHEETS—SHEET 2.

INVENTOR.
James Clyde Haldeman,
ATTYS.

UNITED STATES PATENT OFFICE.

JAMES CLYDE HALDEMAN, OF SALEM, OHIO, ASSIGNOR TO THE SILVER MANUFACTURING COMPANY, OF SALEM, OHIO, A CORPORATION OF OHIO.

FEED MECHANISM.

1,375,694.     Specification of Letters Patent.     Patented Apr. 26, 1921.

Application filed July 11, 1919. Serial No. 310,084.

*To all whom it may concern:*

Be it known that I, JAMES CLYDE HALDEMAN, a citizen of the United States, residing at Salem, in the county of Columbiana and State of Ohio, have invented a new and useful Feed Mechanism, of which the following is a specification.

This invention relates to feed mechanism for drilling machines and has more especial reference to a feed mechanism which may be easily and readily knocked down for the purpose of repairing or replacing parts without the necessity of dismantling the entire gearing and other intricate parts of the feed mechanism.

The objects of the invention are to provide a feed mechanism in which the hand wheel shaft may be easily and readily disconnected by the removal of a pin and the feed clutch shaft may be raised sufficiently to allow the worm to be removed after which the worm wheel may be removed from its shaft, the worm wheel being retained upon the shaft only by the worm; and to generally simplify and improve feed mechanisms.

With these objects in view the invention consists in the novel construction and arrangement of parts, hereinafter described, illustrated in the accompanying drawings and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

A practical embodiment of the invention is disclosed in the accompanying drawings, forming a part of this specification in which similar numerals of reference indicate corresponding parts throughout the several views.

Figure 1:
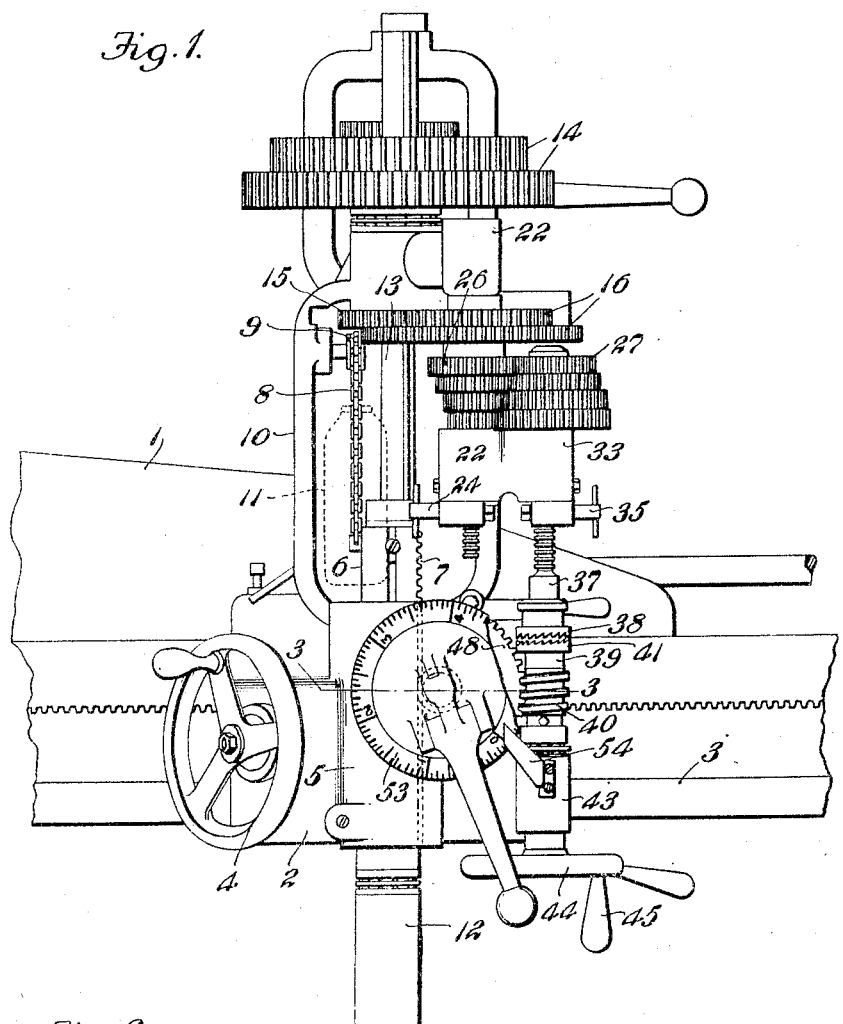
Figure 1 is a side elevation of a portion of a drill arm, showing the feed mechanism embodying the invention.
Figure 3:
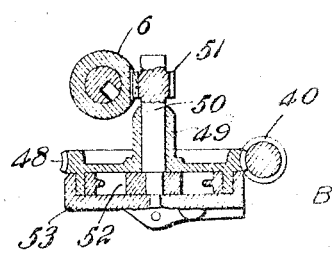
Fig. 3 is a transverse sectional view on line 3—3, Fig. 1.
Figure 2:
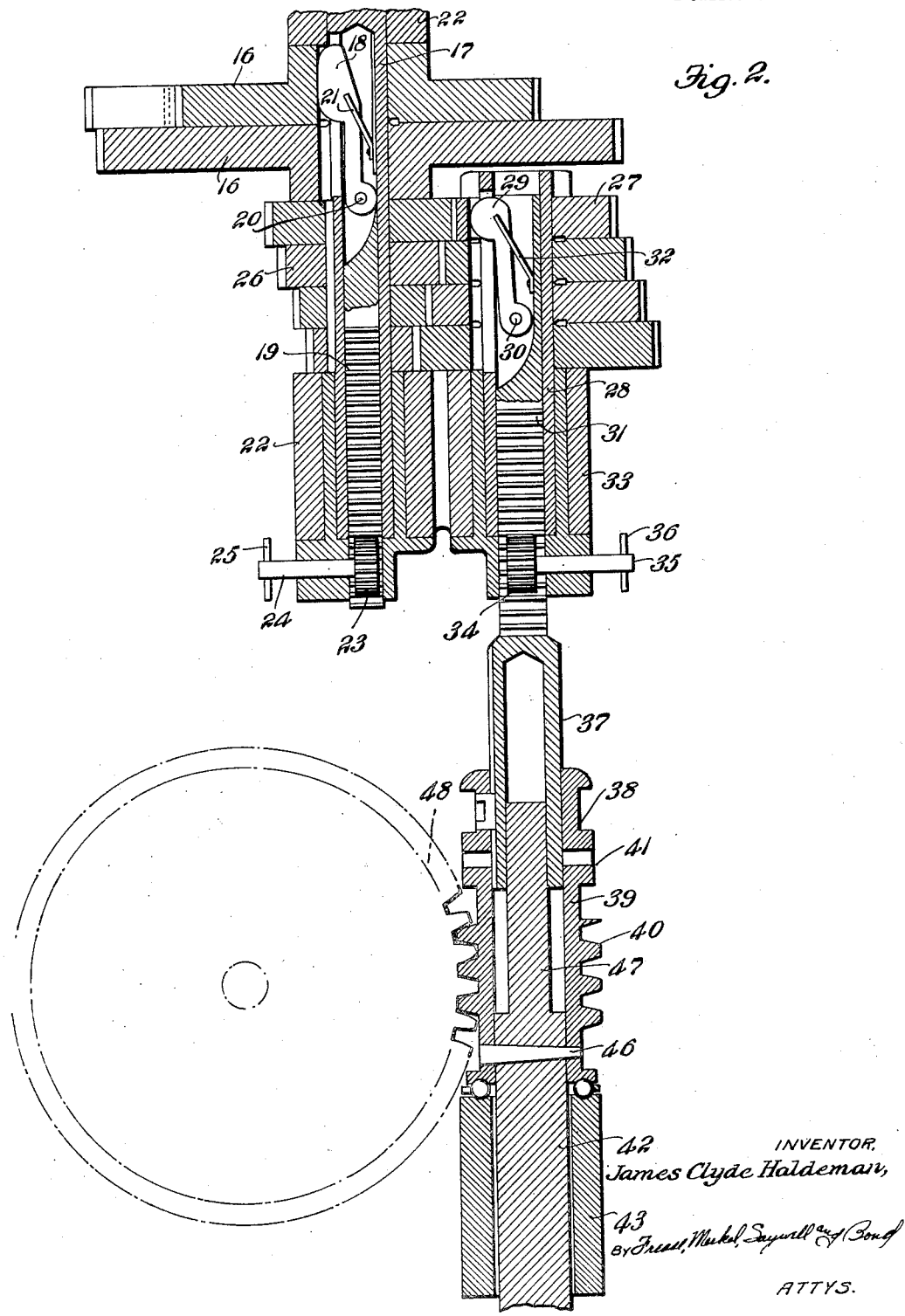
Fig. 2 is a section on an enlarged scale of the feed mechanism.

A portion of the drill arm of a radial drilling machine is indicated by the numeral 1, the feed mechanism to which this invention pertains being carried by said arm. The drill head 2 is mounted upon said arm and arranged to be moved longitudinally upon the slides 3, the mechanism which controls this longitudinal movement of the drill head being operated by the hand wheel 4, but since this forms no part of the present invention it has not been illustrated.

The drill head 2 is provided with a bearing 5 within which is slidably mounted a rack sleeve 6, said rack sleeve being provided upon one side with the teeth 7, a chain 8 being connected to the upper extremity of said sleeve and passing over a pulley 9 carried upon the housing 10, a weight 11 being provided upon the other extremity of said chain for counterbalancing the weight of the drill spindle 12 which is mounted upon a shaft 13.

The shaft 13 is slidable lengthwise within the gears 14 which are of different diameters and which are driven in the usual manner by gears, (not shown) mounted upon the drive shaft. A nest of gears 15 of different diameters is mounted upon the shaft 13, said shaft being slidable lengthwise within said gears. The respective gears mesh with gears of the nest of gears 16 of different diameters normally loose on a tubular shaft 17 but arranged to be selectively fixed to said shaft as by a suitable key 18 pivotally connected to the rack shaft 19, as shown at 20 and arranged to be normally held in engagement with the key ways in the respective gears by means of a spring 21. The tubular shaft 17 is journaled in suitable bearings 22 of the drill head. The rack shaft 19 is slidably mounted within the tubular shaft 17 and is engaged by a pinion 23 mounted upon a shaft 24, a handle 25 being provided thereon for operating the pinion to raise or lower the rack shaft.

The speed of the drive of the spindle is determined by the drive connection between the shaft 13 and the drive shaft (not shown) through the respective gears of the nest of gears 14 and the nest of gears upon the drive shaft (not shown). A nest of gears 26 of different diameters is fast upon the shaft 17, the gears 26 meshing respectively with gears 27 of a coacting nest of gears arranged to be secured to a suitable shaft 28 as by means of a key 29 pivoted at 30 within the slotted end of the rack shaft 31, which rack shaft is slidably mounted within the tubular shaft 38, a spring 32 being provided for normally holding the key 29 in the key-ways of the respective gears 27. The tubular shaft 28 is mounted in a suitable bearing 33 carried upon the drill head. A pinion 34 meshes with the rack shaft 31, said pinion being mounted upon a shaft 35 by means of a handle 36 by means of which the rack shaft may be mounted vertically to throw the key 29 into engagement with any desired gear of the nest 27.

The lower extremity of the rack shaft 31 is provided with a tubular portion 37 upon which is fixed a clutch member 38, said tubular portion 37 also extending into the sleeve 39 upon which is provided the worm 40, a clutch member 41 being arranged at the upper end of said sleeve and arranged to coact with the clutch member 38.

The hand wheel shaft 42 is journaled in a suitable bearing 43 carried upon the drill head and is provided with a hand wheel 44 at its lower end, a handle 45 being provided thereon for operating the shaft. The hand wheel shaft extends into the worm sleeve and is connected thereto by means of a removable tapered pin 46, a reduced portion 47 being formed upon the upper end of the hand wheel shaft and extending into the end of the tubular portion 37 of the rack shaft.

The worm wheel 48 is provided with a sleeve 49 and is mounted upon the cross shaft 50, a pinion 51 being provided upon said cross shaft and meshing with the rack sleeve 6, the worm wheel meshing with the worm 40. A clutch indicated generally by the numeral 52 is mounted upon the cross shaft 50 and arranged to engage the worm wheel 48 but since this clutch forms no part of the present invention it is not illustrated in detail. The dial 53 of a usual form of adjustable dial depth gage is carried by the worm wheel and an indicator 54 is provided upon the bearing 43 to coöperate therewith.

When it is desired to remove the worm wheel it is only necessary to remove the tapered pin 46 after which the hand wheel shaft may be drawn downwardly out of the worm sleeve. The shaft 35 is then rotated by means of the handle 36 in the proper direction to raise the rack shaft 31 a sufficient height to disengage the tubular portion 37 thereof from the worm sleeve after which the entire worm sleeve may be lifted out of the drill head. The dial 53 and clutch 52 may be held upon the extremity of the shaft 50 in any usual and well known manner, and when this dial and clutch are removed and the worm removed from engagement with the worm wheel, it will be seen that the worm wheel may then be slid laterally from the cross shaft.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:—

1. In feeding mechanism of the character described, the combination of a hand wheel shaft, a sleeve mounted upon the upper end of said shaft, a removable pin located through said sleeve and shaft, a shaft located in axial alinement with said hand wheel shaft and extending into said sleeve, a clutch member fixed upon the upper end of said sleeve, a co-acting clutch member slidably mounted upon the axially alined shaft and means for raising said last named shaft out of engagement with the sleeve.

2. In feeding mechanism of the character described, the combination of a shaft, a worm sleeve mounted upon the upper end of said shaft, a removable pin located through the worm sleeve and shaft, a reduced portion formed upon the upper end of the shaft, a tubular shaft extending into the worm sleeve and surrounding said reduced portion, a clutch member fixed upon the upper end of said sleeve, a co-acting clutch member slidably mounted upon the tubular shaft and means for raising said tubular portion out of the sleeve.

3. In feeding mechanism of the character described, the combination of a vertical bearing, a hand wheel shaft journaled therein, a worm sleeve mounted upon said shaft, a removable pin located through the shaft and sleeve, a rack shaft axially alined with the hand wheel shaft and having a portion extending into the sleeve, a clutch member fixed upon the upper end of said sleeve, a co-acting clutch member slidably mounted upon the lower portion of the rack shaft and means for raising said rack shaft out of engagement with the worm sleeve.

4. In feeding mechanism of the character described, the combination with a vertical bearing of a hand wheel shaft journaled in said bearing, a worm sleeve mounted upon the upper end of said shaft, a removable pin located through the sleeve and shaft, a rack shaft axially alined with the hand wheel shaft and provided with a portion extending into the worm sleeve, a pinion meshing with the rack shaft, a clutch member fixed upon the upper end of said sleeve, a co-acting clutch member slidably mounted upon the lower portion of the rack shaft and means for rotating said pinion to raise the rack shaft out of engagement with the worm sleeve.

5. In feeding mechanism of the character described, the combination with a vertical bearing, a hand wheel shaft journaled therein and provided with a reduced upper extremity, a worm sleeve mounted upon the upper end of said shaft, a removable pin located through the sleeve and shaft, a rack shaft axially alined with said hand wheel shaft and provided with a tubular portion extending into the worm sleeve and surrounding the reduced extremity of the hand wheel shaft, a clutch member fixed upon the upper end of said worm sleeve, a co-acting clutch member slidably mounted upon the tubular portion of said shaft, and means for raising said rack shaft out of engagement with the worm sleeve.

6. In feeding mechanism of the character described, the combination with a vertical bearing, a hand wheel shaft journaled therein and provided with a reduced upper extremity, a worm sleeve mounted upon the upper end of said shaft, a removable pin located through the sleeve and shaft, a rack shaft axially alined with said hand wheel shaft and provided with a tubular portion extending into the worm sleeve and surrounding the reduced extremity of the hand wheel shaft, a pinion meshing with said rack shaft, a clutch member fixed upon the upper end of said sleeve, a co-acting clutch member slidably mounted upon the tubular portion of the rack shaft and means for rotating said pinion to raise the rack shaft out of engagement with the worm sleeve.

In testimony that I claim the above, I have hereunto subscribed my name.

JAMES CLYDE HALDEMAN.